United States Patent [19]
Sato et al.

[11] Patent Number: 5,603,062
[45] Date of Patent: Feb. 11, 1997

[54] SYSTEM FOR CONTROLLING DATA FLOW BETWEEN PLURALITY OF HOST INTERFACES AND DRIVE INTERFACES USING CONTROLLER FOR SELECT UNOCCUPIED INTERFACES AFTER PREPARATION OF READ/WRITE OPERATION IS COMPLETE

[75] Inventors: Masahiko Sato; Kazuo Nakagoshi; Naoya Takahashi, all of Odawara; Akira Chuma; Yoshio Yukawa, both of Kanagawa-ken, all of Japan

[73] Assignee: Hitachi, Ltd., Tokyo, Japan

[21] Appl. No.: 148,484

[22] Filed: Nov. 8, 1993

[30] Foreign Application Priority Data

Nov. 11, 1992 [JP] Japan ............................ 4-301367

[51] Int. Cl.⁶ ........................ G06F 13/00; G06F 13/36
[52] U.S. Cl. ...................... 395/872; 395/873; 395/427; 395/886
[58] Field of Search ........................ 395/275, 550, 395/425, 872, 873, 427, 886

[56] References Cited

U.S. PATENT DOCUMENTS

| | | | |
|---|---|---|---|
| 4,028,666 | 6/1977 | Suzuki et al. | 340/172.5 |
| 4,591,973 | 5/1986 | Ferris, III et al. | 364/200 |
| 5,029,124 | 7/1991 | Leahy et al. | 364/900 |
| 5,097,483 | 3/1992 | Bechtolsheim | 375/17 |
| 5,280,589 | 1/1994 | Nakamura | 395/325 |
| 5,388,217 | 2/1995 | Benzschawel et al. | 395/275 |

FOREIGN PATENT DOCUMENTS 60-74057A  4/1985  Japan.

*Primary Examiner*—Thomas C. Lee
*Assistant Examiner*—Rehana Perveen Krick
*Attorney, Agent, or Firm*—Kenyon & Kenyon

[57] ABSTRACT

An external storage system is connected to a host system. A controller unit interposed between disk drives and the host system has a large capacity buffer memory with a battery providing non-volatile storage, a plurality of host interfaces and a plurality of drive interfaces. All the accesses made to the disk drives from the host system are realized via the buffer memory which allows a high-speed access. Read/write processing performed for the buffer memory by the host system is executed asynchronously with read/write processing performed between the buffer memory and the disk drives. The drive interface and the host interface area released during a period in which operation of the disk drive is waited for and recoupled upon data transfer.

2 Claims, 6 Drawing Sheets

RR: READ REQUEST
SC: SEEK COMMAND
DR: DATA READ
DT: DATA TRANSFER

SYSTEM FOR CONTROLLING DATA FLOW BETWEEN PLURALITY OF HOST INTERFACES AND DRIVE INTERFACES USING CONTROLLER FOR SELECT UNOCCUPIED INTERFACES AFTER PREPARATION OF READ/WRITE OPERATION IS COMPLETE

CROSS-REFERENCE TO RELATED APPLICATION

This application relates to U.S. patent application Ser. No. 08/121,115 filed on Sep. 13, 1993 by Kobashi et al. The content of that application is incorporated herein by reference.

BACKGROUND OF THE INVENTION

1. Field of the Invention

The present invention generally relates to an external storage system or equipment and more particularly to an external storage system typified by a magnetic disk system for an information processing system such as an OLTP (OnLine Transaction Process) system, a RDB (Relational DataBase) system and the like for which a high throughput and a high-speed I/O operation are required.

2. Description of the Related Art

With the advent of high-performance microcomputers, there have been developed computer systems which are capable of executing data processing at an extremely high speed. Besides, in accompanying a trend for implementation of databases or the like in a large capacity, the amount or scale of data handled by these computer systems tends to increase more and more.

Under the circumstances, the number of I/O requests issued per unit time by the computer system to a magnetic disk subsystem, which is a typical one of the external storage systems, has increased dramatically in recent years. Unfortunately, the access speed which the magnetic disk subsystem allows is extremely low when compared with the operation speed of a CPU (Central Processing Unit) incorporated in the computer as well as the access speed of a main memory because the access to the magnetic disk subsystem intrinsically involves mechanical operations. For this reason, the magnetic disk subsystem provides a bottleneck in enhancing the processing capability of the computer system. Put another way, the performance of the computer system is affected remarkably by the throughput of the magnetic disk subsystem.

Heretofore, as an attempt to solve the problem mentioned above, it is known to provide a read cache operative on the LRU (Least Recently Used) data principle for the external storage system such as a magnetic storage subsystem. More specifically, data read out from a magnetic disk is once placed in the read cache in accordance with the LRU principle, and when the host system issues a read request, it is checked in the external storage system itself whether or not the data requested by the host system is resident in the read cache. When the data of concern is found in the cache memory (i.e., upon cache hit), the data in the cache memory is transferred to the host system without making access to the external storage system such as the magnetic disk subsystem. In this manner, the time required for reading the data from a magnetic disk medium can be shortened.

In this regard, there is disclosed in JP-A-60-74057 a technique tackling the solution of a so-called device cross call problem by connecting a plurality of disk controllers to a plurality of magnetic disk drivers. This technique is also based on application of the LRU read cache scheme.

The techniques mentioned above can not be applied to the data write operation for the magnetic disk at all. Consequently, it is impossible to shorten the time taken for writing data in the magnetic disk. For these reasons, it can be said that the I/O performance of the magnetic disk subsystem can not always satisfy the requirements imposed by the computer system, when viewed in total.

Further, in the external storage system known heretofore, the magnetic disk controller incorporated therein is designed to issue in response to a read/write command generated by a host system a seek command to a disk drive of hierarchically lower rank. In that case, the interface bus is retained in the connected state during a seek period or time taken for a magnetic head to reach a track of concern and a sector waiting time taken for a relevant sector arrives at a position beneath the head. Consequently, in case the I/O requests are issued by the host at an extremely high frequency, the interface bus provides a bottleneck which incurs a problem that the number of I/O requests which can be processed by the external storage system (e.g. magnetic disk subsystem) is thereby limited or restricted.

In recent years, in view of the requirement for a large storage capacity of the external storage system of the computer as well as dispersion of processings as in the case of a client/server system, it has been attempted to increase the capacity of the external storage system by incorporating a number of magnetic disk drives in a magnetic disk subsystem while connecting a plurality of host computers to the magnetic disk subsystem. Thus, the latter has to process the access requests issued from the plurality of host computers. In that case, the controller incorporated in the magnetic disk subsystem has to control interconnections between a plurality of host computers and a plurality of magnetic disk drives.

According to the known technique mentioned above, the controller is connected to plural host computers and plural magnetic disk drives in a daisy-chain configuration. When an I/O request is issued from a given one of the computers, the interface bus is occupied by that given computer until the I/O request issued by the same has been disposed of. In the meanwhile, the other hosts or computers are forced to wait for release of the bus in the standby state. In this manner, the interface bus provides a bottleneck in that the number of the I/O requests allowable to be issued simultaneously is restricted. This problem may be solved by providing the interface bus for each of the host computers or the disk drives. In that case, however, the controller will become intolerably expensive and of very large scale, giving rise to another problem.

SUMMARY OF THE INVENTION

The present invention provides an external storage system which is capable of realizing a significant reduction in a response time involved in realizing a read/write request issued from a host system and a significant increase in the number of read/write requests which the host system can issue.

Usually, in the external storage system such as the magnetic disk system, data writing operation to a magnetic disk in a disk drive is performed only after a magnetic head of the disk drive has been moved to a cylinder of concern and the head has been brought to a position above a relevant sector by rotating the disk. Thus, the times involved in these mechanical operations typified by the seek time taken for moving the head and the rotational delay taken for the relevant sector to be positioned beneath the head present additional overhead which degrades the I/O performance for the data write operation.

An external storage system according to an aspect of the present invention includes a temporary data hold unit which allows access thereto at a very high speed when compared with that of a storing medium. In response to a data write request to a storing medium such as a magnetic disk from a host system, data to be written is once stored in the temporary data hold unit. Upon completion of storage of the data in the temporary data hold unit, the external storage system informs the host system of completion of the data write operation. However, actual writing of the data to the storing medium from the temporary data hold unit is executed asynchronously with the timing at which the write request is issued from the host system. When a magnetic disk is employed as the storing medium, the standby time such as the seek time and the rotational delay required for the mechanical operations mentioned previously do not exert any appreciable influence to the data write processing. Thus, the I/O requests issued by the host system can be processed at an extremely high speed independent of operation performance of the disk drive. Further, the time for which a bus interconnecting the host system and the external storage system is occupied for the data write operation can be shortened. Consequently, throughput of the external storage system which is heretofore limited by the availability of the bus can significantly be enhanced.

Further, in a drive interface for interconnecting an input/output control unit incorporated in the external storage system and the drive unit for the storing medium such as a magnetic disk, the input/output control unit once releases the drive interface port at a time point when a read/write command is issued to the drive and reconnects the drive interface port when preparation for the read/write operation has been completed in the disk drive. When the external storage system includes a plurality of storing medium drive units, the drive interface can be employed for performing the I/O processing with another drive unit during a time interval intervening between the release and the reconnection for one drive unit as mentioned above. Further, in the case where the external storage system includes a plurality of drive interfaces so as to allow an unoccupied interface to be dynamically selected for establishing the aforementioned reconnection, these interfaces can be utilized very effectively. Additionally, the standby time for the reconnection can be shortened. As the consequence, the number of I/O requests which can be accepted and processed per unit time is increased to such extent that the device cross-calls which take place when the external storage system is shared by a plurality of hosts can satisfactorily be coped with.

The input/output control unit can equally perform the similar control for a host interface interposed between the external storage system and the host system as well, which is advantageous when the external storage system is shared by a plurality of host systems. Additionally, the external storage system may include a plurality of host interfaces with a view to further enhancing the throughput of the system.

DETAILED DESCRIPTION

Now, the present invention will be described in detail in conjunction with preferred or exemplary embodiments thereof by reference to the accompanying drawings.

Figure 1:
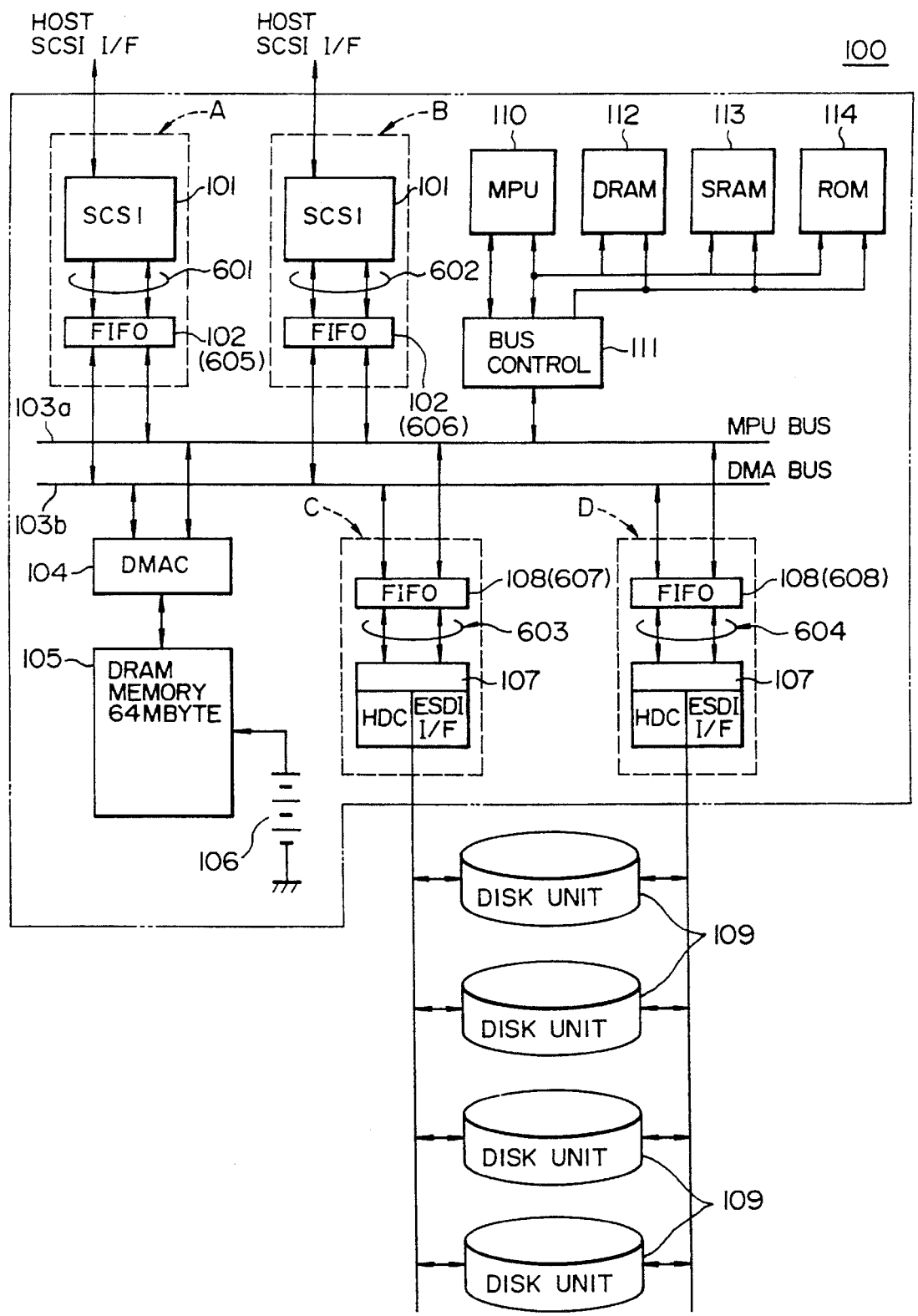
FIG. 1 is a block diagram showing a general arrangement of an external storage system according to an embodiment according to the present invention.

FIG. 1 is a block diagram showing conceptually a structural configuration of an external storage system according to an embodiment of the invention. In the following description, it is assumed, only by way of example, that the external storage system is constituted by a magnetic disk system which may be referred to as the magnetic disk subsystem when viewed from a host system not shown.

The magnetic disk subsystem according to the illustrated embodiment includes a plurality of disk units 109 each comprised of a drive unit and a magnetic disk serving as a storage medium for storing data in a non-volatile condition and a controller unit generally denoted by 100 for controlling data transfer between the disk units 109 and a host computer (not shown and hereinafter also referred to simply as the host).

Connected to a MPU (MicroProcessor Unit) bus 103*a* and a direct DMA (Direct Memory Access) bus 103*b* of the controller unit 100 are a pair of host interfaces A and B also connected to the host and a pair of drive interfaces C and D to which a plurality of disk units 109 are connected in a daisy chain fashion.

Each of the plural host interfaces A and B includes a SCSI (Small Computer System Interface) protocol chip 101 for controlling information or data transaction with the host in accordance with a SCSI protocol and an FIFO (First-In First-Out) memory 102 interposed between the SCSI protocol chip 101 and the MPU bus 103*a* and the DMA bus 103*b*.

On the other hand, each of the plural drive interfaces C and D is comprised of an ESDI (Enhanced Small Device Interface) protocol chip 107 for information or data transfer with the disk units 109 which are connected to the controller unit 100 in conformance with the ESDI protocol and an FIFO memory 108 interposed between the ESDI protocol chip 107 on one hand and the MPU bus 103*a* and the DMA bus 103*b* on the other hand.

Further connected to the MPU bus 103*a* and the DMA bus 103*b* is a buffer memory 105 via a DMAC (Direct Memory Access Controller) 104, in which the buffer memory 105 is constituted by a semiconductor memory (dynamic random access memory or DRAM having a self-refresh function) which has a capacity, for example, of 64 MB (megabytes). The buffer memory 105 is so arranged as to be supplied with an electric power from a main power supply source (not shown) and a battery 106 which is constantly charged from the main power supply so that the buffer memory 105 can hold the data stored therein about one week at the least under the power supply from the battery 106 in the event the main power supply is interrupted for some reason.

Further, connected to the MPU bus 103a via a bus controller 111 are a microprocessor (MPU in abbreviation) 110 which is in charge of control of the whole magnetic disk subsystem according to the illustrated embodiment of the invention, a control memory (constituted by a dynamic random access memory or DRAM in abbreviation) 112, a control memory (static random access memory or SRAM) 113 and a control memory (read-only memory or ROM) 114 for storing control programs for the microprocessor 110 and providing work memory areas in such a configuration that a series of control operations described below can be realized.

The following description is directed to exemplary or typical operations of the magnetic disk subsystem according to the instant embodiment.

Figure 2:
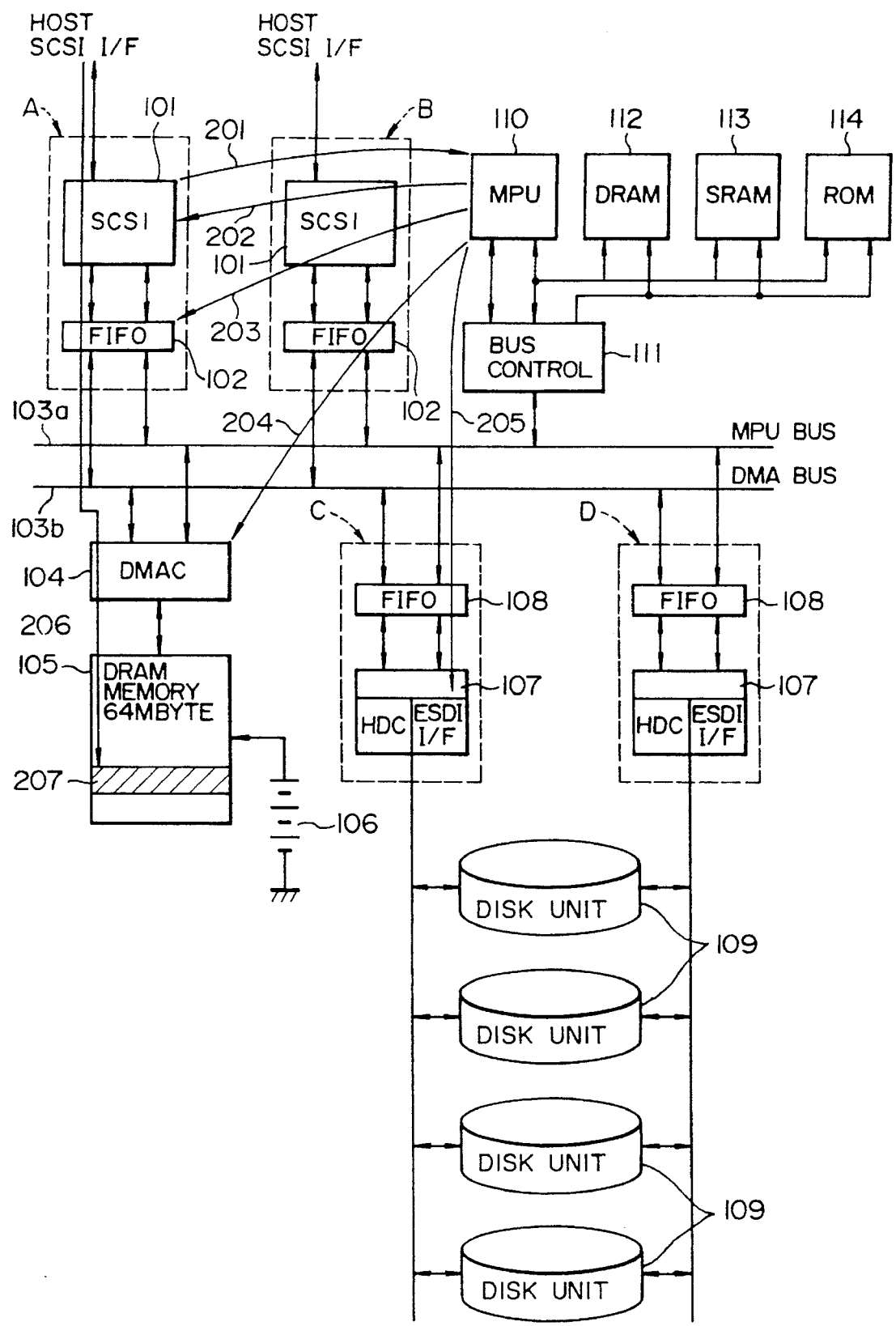
FIG. 2 is a conceptual view for illustrating data flow during a first phase of data write operation performed in the external storage system shown in FIG. 1.
Figure 3:
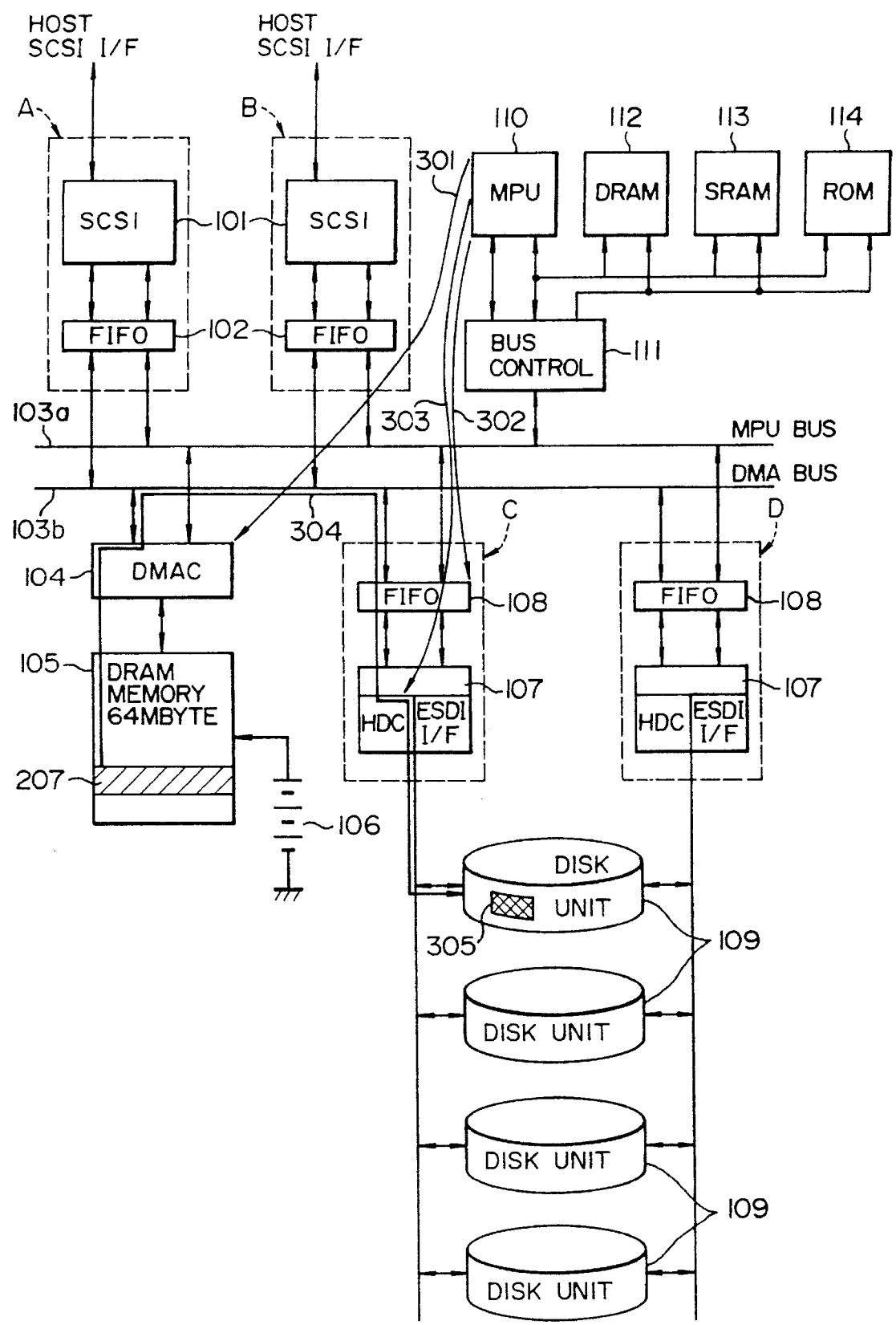
FIG. 3 is a conceptual view for illustrating data flow during a second phase of data write operation performed in the external storage system shown in FIG. 1.

FIGS. 2 and 3 show in combination data flows in the case where data are to be written in the disk units 109 from the host not shown.

FIG. 2 shows processings involved in transferring data from the host to the buffer memory 105. In response to reception of a data write request from the host, the SCSI protocol chip 101 issues an interrupt signal 201 to thereby allow the microprocessor (MPU) 110 to recognize the data write request. In conformance with this data write request, the microprocessor 110 sets up or initializes various registers for effecting the DMA (Direct Memory Access) transfer to the SCSI protocol chip 101, the FIFO memory 102 and the DMA controller 104 via the bus controller 111 and the MPU bus 103a (these accesses are indicated by arrows 202, 203 and 204, respectively).

Upon completion of the set-up mentioned above, the DMA data transfer is performed from the host to the buffer memory 105 via a path 206. During this DMA transfer, the microprocessor (MPU) 110 issues a seek instruction to the cylinder which is to store the data, a command for switching the magnetic heads and other to the relevant disk unit 109 via the MPU bus 103a and an ESDI (Enhanced Small Device Interface) protocol chip 107, as indicated by an arrow 205. Upon completion of the DMA transfer from the host and the seek operation in the relevant disk unit 109, the microprocessor 110 then transfers data 207 written and stored in the buffer memory (DRAM) 105 to the disk unit 109 of concern.

Flow of the data 207 in this case is illustrated in FIG. 3. The microprocessor (MPU) 110 sets up conditions for the DMA transfer to the DMA controller (DMAC) 104, the ESDI protocol chip 107 and the FIFO memory 108 via the MPU bus 103a, as indicated by arrows 301, 302 and 303, respectively. Upon completion of the set-up mentioned above, the data 207 once stored in the buffer memory (DRAM) 105 is transferred to the relevant disk unit 109 from the buffer memory 105 via a path 304 to be written in a memory location 305 of that disk unit 109.

Figure 4:
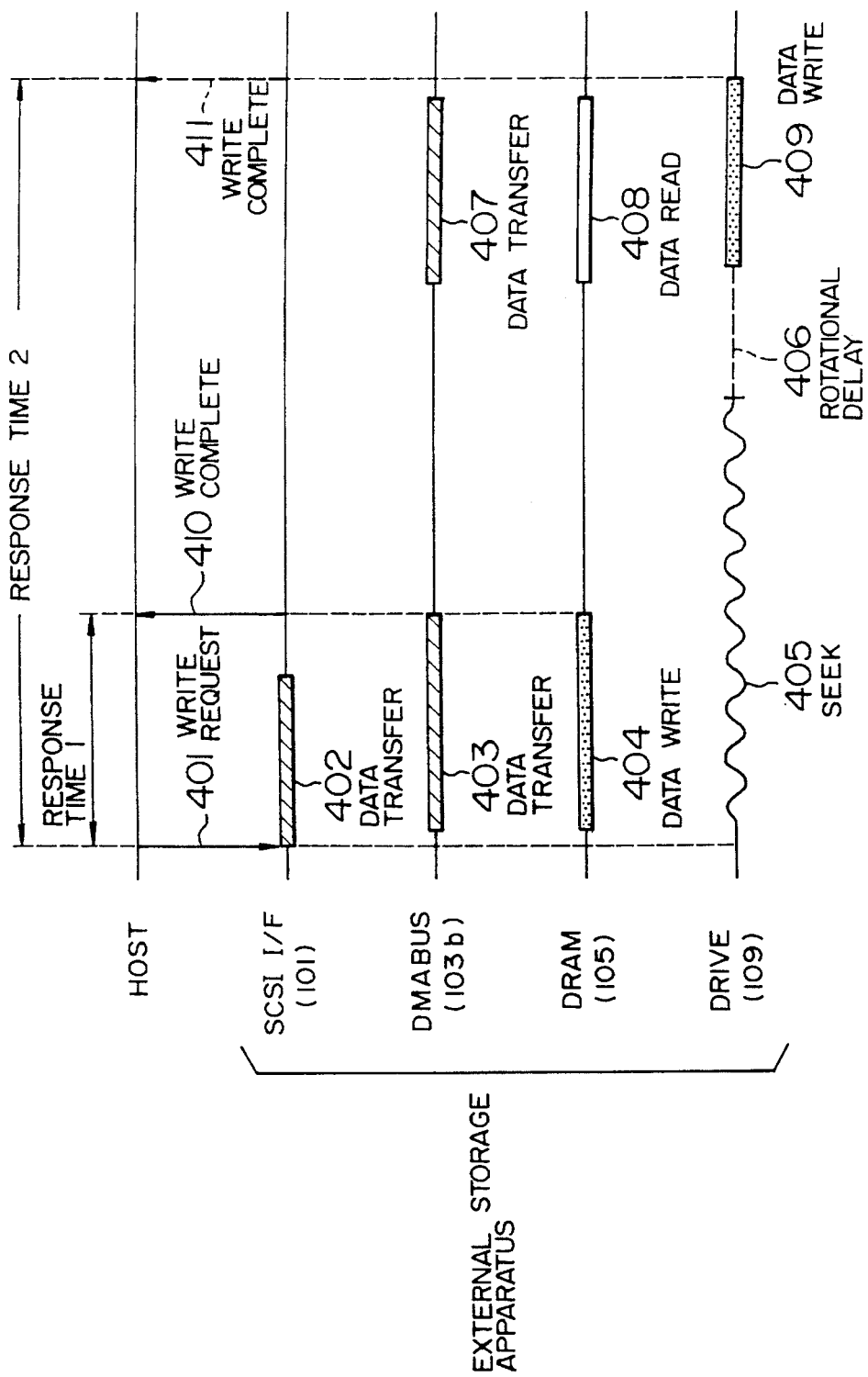
FIG. 4 is a time chart illustrating control operations involved in data write processing for the external storage system according to an embodiment of the invention.

FIG. 4 illustrates in a time chart controls involved in the data transfer described above. More specifically, this figure illustrates in parallel the processings performed by the host, the SCSI protocol chip (SCSI I/F) 101, the DMA bus 103b, the buffer memory (DRAM) 105 and the disk unit (DRIVE) 109. When a write request is issued in the host at a time point 401, the host transfers data to be written to the controller unit 100 during a time interval or period 402. Simultaneously, in the controller unit 100, the DMA transfer to the buffer memory (DRAM) 105 from the SCSI protocol chip 101 is started to transfer the data during an interval 403 via the DMA bus 103b, which data is temporarily written in the buffer memory 105 (404).

The reason why the DMA transfer is accompanied with some delay can be explained by the fact that the data is buffered in the FIFO memory 102. This delay time is however extremely short when compared with the time taken for the data transfer. Simultaneously with the data transfer operation, a seek command is issued to the relevant disk unit 109, which then responds by executing a seek operation during an interval 405. Upon completion of the seek operation, the disk unit 109 waits for a sector in which the data is to be written to reach the position immediately below the magnetic head in an interval 406. Upon arrival of the sector underneath the magnetic head, the data is read out from the buffer memory 105 (408), whereupon the DMA data transfer is effected via the DMA bus 103b (407), as a result of which data write operation to the disk unit 109 is performed in an interval 409.

In the case of the conventional disk controller, a command end (WRITE COMPLETE) message 411 is issued to the host at the time point the data received from the host has completely been written in the disk unit 109. Consequently, a period or duration extending from the start of the data transfer to the issuance of the command end (WRITE COMPLETE) message 411 to the host (indicated by "RESPONSE TIME 2" in FIG. 4) is required as the time taken for a single write operation to be executed.

In contrast, in the case of the instant system, the command end (WRITE COMPLETE) message 410 is issued to the host already at the time point when the data transfer to the buffer memory (DRAM) 105 is completed in succession to the completion of the DMA transfer in the interval 403. Accordingly, for the host, a temporal period from which the seek interval 405 and the rotational delay 406 in the disk unit 109 are subtracted represents the time required for execution of the single write command, as indicated by "RESPONSE TIME 1" in FIG. 4, which means that the command can be executed at an extremely high speed when compared with "RESPONSE TIME 2" in the conventional system. As will be understood from the above, the data write operation to the disk unit 109 is executed asynchronously with the processing for responding to the host. More specifically, when I/O (read/write) requests from the host are temporarily congested, the data write operation to the disk unit 109 is transiently suspended by holding temporarily the data in the data buffer (105) and when the frequency of the I/O requests decreases, the write operation to the disk unit 109 is executed. In this manner, the speed at which the commands issued from the host are processed can further be increased.

On the other hand, in the case where empty area is unavailable in the buffer memory (DRAM) 105, the data from the host is received after the write operation of the data held in the buffer memory 105 to the disk unit 109 has been completed. Consequently, the throughput becomes low as in the case of the conventional system. However, in practical applications, such event or situation is unlikely to occur when the buffer memory 105 of a large capacity is used, because cooccurrence of an extremely large number of I/O requests is very rare.

In this conjunction, a problem arises that the data will be lost when the main power supply is interrupted for some reason before the data is actually written to the disk unit 109 in succession to the command end (WRITE COMPLETE) message to the host upon completion of the DMA data transfer to the buffer memory 105 from the host.

In the case of the external storage system according to the instant embodiment of the invention, the buffer memory 105 is backed up by the battery 106. Accordingly, the buffer memory 105 can serve as a nonvolatile memory and hold the content stored therein about one week, whereby unavailability of the data or possibility of data being lost can positively be avoided. However, in order to ensure a high reliability against loss of data, it is desirable to adopt such a processing scheme that all the data stored in the buffer memory 105 are transferred to the disk unit 109 before interruption of the main power supply when the system is to be turned off in the normal state.

When data is to be read out to the host from the disk unit 109, processing reverse to the data write processing described above is performed. In other words, data is read out from the disk unit 109 to the buffer memory 105, and the data transfer to the host from the buffer memory 105 is executed after the data of concern has been saved in the buffer memory 105. In this case, since the access to the disk unit 109 has to be made in precedence, the high-speed response mentioned above in conjunction with the data write processing can not be realized. However, it should be mentioned that when one and the same data held in the buffer memory 105 is to be read out again or repeatedly, i.e., upon occurrence of cache hit, the data can be transferred straightforwardly from the buffer memory 105, which permits a high-speed access to be realized without necessity for reading out the data from the disk unit 109. Thus, execution of the command can be realized at an extremely high speed. In general, when the data access is made at short intervals, the range of data to be accessed is often physically limited. Accordingly, by holding the data written in the disk unit in the buffer memory 105 as well, the cache hit ratio can be increased.

According to the teaching of the invention in the embodiment under consideration, the I/O (read/write) request from the host and the actual access to the disk unit 109 are separated from each other, wherein the I/O request from the host is realized at a significantly high speed because of transaction only with the buffer memory 105. Consequently, data transfer with the host can enjoy a high throughput.

Next, let's consider the situations in which the unoccupied area is unavailable in the buffer memory 105 in the data write operation while mis-hit takes place in the buffer memory 105 in the data read operation. In this case, realization of the access request issued from the host is necessarily accompanied with the access to the disk unit 109. The situation mentioned above will be encountered in a multi-host system where a magnetic disk subsystem is shared by a plurality of hosts and where the I/O requests are issued at an extremely high rate.

In the situation mentioned above, not only the seek time and the sector arrival time of the disk unit 109 which are additionally included in the time required for the command execution but also the time for awaiting the release of the host interface and the drive interface (interface bus) from the state where of the I/O requests are issued in congestion or confliction does degrade the throughput. In other words, there arises the problem that the throughput is lowered due to the so-called bus bottleneck and thus the number of I/O processings which can be executed per unit time is decreased. With a view to solving the problems, the present invention in the illustrated embodiment provides a plurality of host interfaces A and B and a plurality of drive interfaces C and D. Further, the microprocessor 110 incorporated in the controller unit 100 is so programmed as to perform such control that the host interfaces and the drive interfaces are once released during the seek operation carried out in the disk unit 109 or when the sector arrival is being waited for after reception of a read request, and they are again recombined when the data transfer is to be effected. In this regard, it should be mentioned that in case a plurality of interfaces are provided, the interfaces which differ from those released may be used in the recombination.

Figure 5:
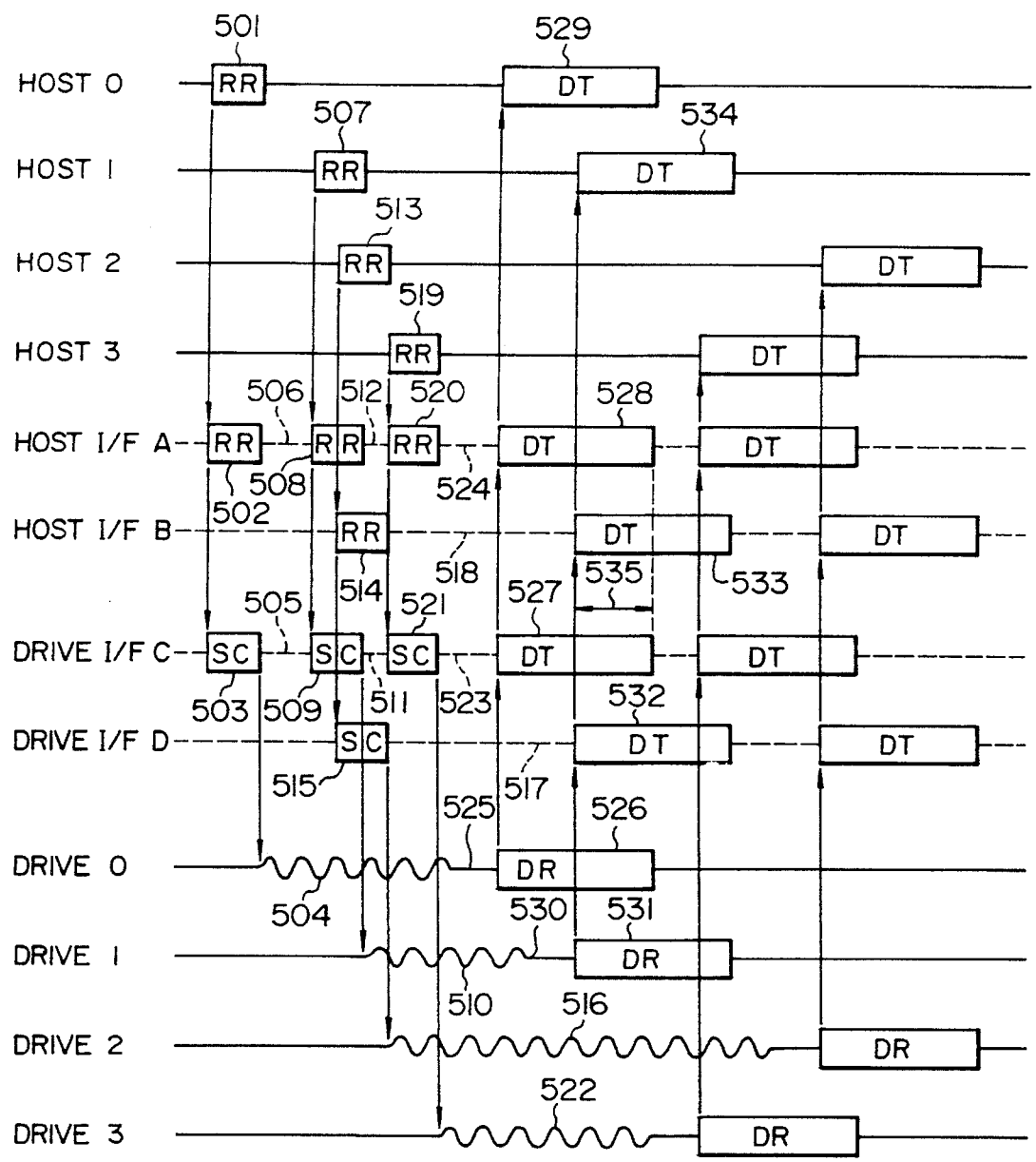
FIG. 5 is a time chart for illustrating, by way of example, operations of the external storage system according to an embodiment of the invention.

FIG. 5 shows a time chart for illustrating an example of processing based on the control algorithm mentioned above.

In the case of the example illustrated in FIG. 5, it is assumed that four hosts labeled "0" to "3" are connected to the controller through a pair of host interfaces A and B and that four disk drives (disk units) labeled "0" to "3" are connected to the controller via two drive interfaces C and D. Connection and control of the interfaces are made such that each of the hosts "0" to "3" can use either of the host interfaces A and B and that each of the disk drives "0" to "3" can use either of the drive interfaces C and D.

Further, in the operation time chart shown in FIG. 5, it is assumed that the hosts "0", "1", "2" and "3" issue read commands to the drives (disk units) "0", "1", "2" and "3", respectively, and that all of these read commands are mis-hit, necessitating thus the access to the disk unit 109.

Now, referring to FIG. 5, when a read command is issued from the host "0" in an interval 501, the controller unit 100 receives the command via one of the host interfaces (e.g. the host interface A) during an interval 502 and issues a seek command to the drive "0" via the drive interface C during an interval 503. The drive "0" performs the seek operation in an interval 504. During the seek operation, neither the host interface A nor the drive interface C is used, and they are released in intervals 505 and 506.

Subsequently, when a read command is issued from the host "1" in an interval 507, the controller unit 100 receives that command via the unoccupied host interface A in an interval 508 and issues a seek command to the drive 1 via the unoccupied drive interface C in an interval 509. The drive 1 performs the seek operation during a interval 510. Subsequently, the host interface A and the drive interface C are released in intervals 511 and 512, as in the case of the processing of the read command for the drive "0".

Next, in an interval 513 succeeding to the read command issue interval 507 mentioned above with a slight delay, the host "2" issues a read command.

At this time point, however, the host interface A and the drive interface C are used for processing the read command from the host 1. Consequently, the host interface B receives this command in an interval 514, which is then followed by issuance of a seek command to the drive "2" of concern via the drive interface D in an interval 515. The drive "2" performs the seek operation during an interval 516, while the host interface B and the drive interface D are released in intervals 517 and 518, respectively.

In a succeeding interval 519, the host 3 issues a read command. At this time point, the host interface A and the drive interface C have been already released. Thus, the read command is received via the unoccupied host interface A in an interval 520, whereupon a seek command is issued to the drive "3" via the drive interface C. The drive "3" performs the seek operation in an interval 522. In the meanwhile, the host interface A and the C are released in intervals 523 and 524, respectively.

When the magnetic heads arrive at relevant sectors after the seek operations performed by the drives "0" to "3", respectively, in response to the commands as mentioned above, interrupts are issued to the microprocessor 110 from the drives "0" to "3", in response to which the microprocessor 110 establishes the reconnections between the drives "0" to "3" and the host "0" to "3", respectively, whereupon data transfers are carried out.

In the case of the example illustrated in FIG. 5, it is assumed that the seek operation of the drive "0" is first completed.

In an interval 525, the drive "0" waits for the arrival of the relevant sector underneath the head, which is then followed by data transfer from the drive "0" in an interval 526. This data is sent to the host "0" via the drive interface C and the host interface A reconnected in intervals 527 and 528, respectively.

In succession, the seek operation of the drive "1" comes to an end. After awaiting the sector arrival in an interval 530, the drive "1" starts data transfer in an interval 531. At this time point, however, the drive interface C and the host interface A are occupied by the data transfer from the drive "0". Consequently, the drive interface D and the host interface B both unoccupied are reconnected in intervals 532 and 533, respectively, whereby the data is sent to the host "1" in an interval 534.

As can be appreciated from the foregoing, the host interface A and the drive interface C are used for the read command issued by the host 1, while for the reconnection the host interface B and the drive interface D which are not occupied are selected.

Subsequently, reconnection for the drive "2" and the drive "3" are performed in a similar manner for thereby completing the transfer of all the data.

In the conventional system in which no more than a single interface is provided for each of the host and the drive and in which the function for dynamic disconnection and reconnection for the interfaces is absent, the data transfer processings between the hosts "0"–"3" and the drives "0"–"3" have to be carried out sequentially, requiring about 2.5 to 3 times as long a time for the data transfer processing when compared with the processing according to the illustrated embodiment of the invention.

Parenthetically, although a variety of modes are conceivable for the connections between a plurality of hosts and a plurality of host interfaces and the connections for a plurality of disk drive units and a plurality of drive interfaces, it will be easy for those skilled in the art to select an optimal pattern of connections to this end in consideration of the nature of the system, performance as desired and the cost as involved in the realization. Besides, manners of selecting one of a plurality of host interfaces and one of a plurality of drive interfaces upon issuance of read requests and data transfer are matter of choice in design.

Description will now be directed to a load imposed on the DMA bus for data transfer. In an interval 535 shown in FIG. 5, the DMA transfer is performed via all of the host interfaces A, B and the drive interfaces C, D which means that the accesses to the buffer memory 105 progress simultaneously.

Under these circumstances, according to another feature of the invention, it is proposed to provide FIFO memories 102 and 108 for the host interface A and the drive interface C, respectively, to thereby realize the DMA transfer through a cycle-steal-based time division processing.

Figure 6:
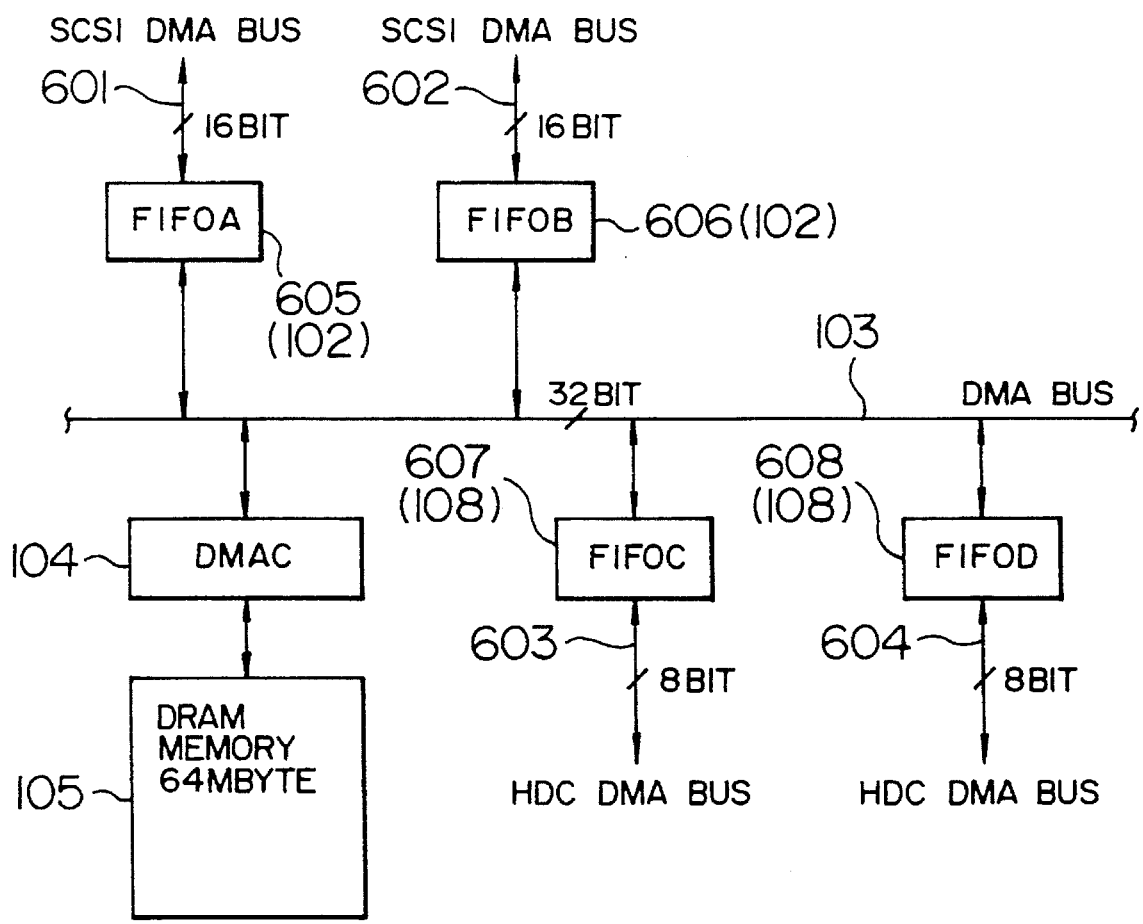
FIG. 6 is a conceptual diagram for illustrating a DMA transfer route.

FIG. 6 is a conceptual diagram for illustrating a DMA transfer route.

The buses 601 and 602 for an FIFO memory-A 605 and an FIFO memory-B 606, respectively, are coupled to SCSIs of the host interfaces A and B, while buses 603 and 604 for an FIFO memory-C 607 and an FIFO memory-D 608 are coupled to a ESDIs of the drive interfaces C and D.

The DMA controller 104 selects one of the FIFO memories 605 to 608 for controlling the data transfer with the buffer memory 105 via the DMA bus 103. In order to realize the data transfer via the buses 601 to 604 continuously and simultaneously, the data transfer speed of the DMA bus 103 has to exceed a sum of bus transfer speeds of the buses 601 to 604.

In the case of the controller unit 100 according to the instant embodiment, the transfer rate of the buses 601 and 602 connected to the hosts is 10 MB/sec. at maximum with a bus width of 16 bits, while the transfer rate of the buses 603 and 604 connected to the disk drives is 5 MB/sec. with a bus width of 8 bits requiring that the DMA bus 103 has a transfer speed higher than 30 MB/sec. In order to realize such high-speed data transfer as mentioned above, the controller unit 100 according to the instant embodiment uses a DMA bus 103 of 32 bits in width, wherein the data width conversion between the DMA bus 103 and the buses 601 and 602 as well as the buses 603 and 604 is realized with the aid of the FIFO memories 605 to 608.

As will now be understood from the foregoing, in the external storage system according to the illustrated embodiments of the invention, the response time for the access request as viewed from the host can significantly be reduced, to allow the number of I/O requests per unit time to be remarkably increased, to a great advantage.

By way of example, simulation executed by the inventors for a magnetic disk subsystem implemented in the configuration disclosed herein, it has been observed that the number of I/O requests as issued can be enhanced above 60% on an average with a mean response time being reduced about 57% when compared with those of a conventional system in which a single host interface and a single drive interface are provided, and no buffer memory is provided.

Many features and advantages of the present invention are apparent from the detailed description and thus it is intended by the appended claims to cover all such features and advantages of the system which fall within the spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

What is claimed is:

1. An external storage system connected to at least one host system for performing data transfer with said host system, comprising:

at least one storage unit having a non-volatile first storing medium; and an input/output control unit including,
a plurality of host interfaces,
a plurality of drive interfaces,
a bus connected to said host interfaces and said drive interfaces, and
a controller controlling data flow on said bus;

wherein said controller sets said host interfaces and said drive interfaces free until preparation for data read/write operation in response to a read/write command issued from said host system has been completed, and, upon completion of the preparation for the read/write operation, said controller selects an unoccupied one of said host interfaces and an unoccupied one of said drive interfaces to perform data transfer, wherein the bus of said input/output control unit has a data transfer capability not smaller than a sum of data transfer capabilities of said host and said drive interfaces.

2. An external storage system connected to at least one host system for performing data transfer with said host system, comprising:

at least one storage unit having a non-volatile first storing medium; and an input/output control unit including,
a plurality of host interfaces,
a plurality of drive interfaces,
a bus connected to said host interfaces and said drive interfaces, and
a controller controlling data flow on said bus;

wherein said controller sets said host interfaces and said drive interfaces free until preparation for data read/write operation in response to a read/write command issued from said host system has been completed, and, upon completion of the preparation for the read/write operation, said controller selects an unoccupied one of said host interfaces and an unoccupied one of said drive interfaces to perform data transfer, wherein each of said host interfaces includes a first FIFO memory for holding data temporarily, wherein each of said drive interfaces includes a second FIFO memory for holding data temporarily, wherein each of said first FIFO memories and each of said second FIFO memories perform conversion of data width between each of said interfaces and said bus.

* * * * *